Oct. 14, 1930.   J. F. MADDOCKS ET AL   1,778,425
ARTICLE CARRIER
Filed Aug. 1, 1929
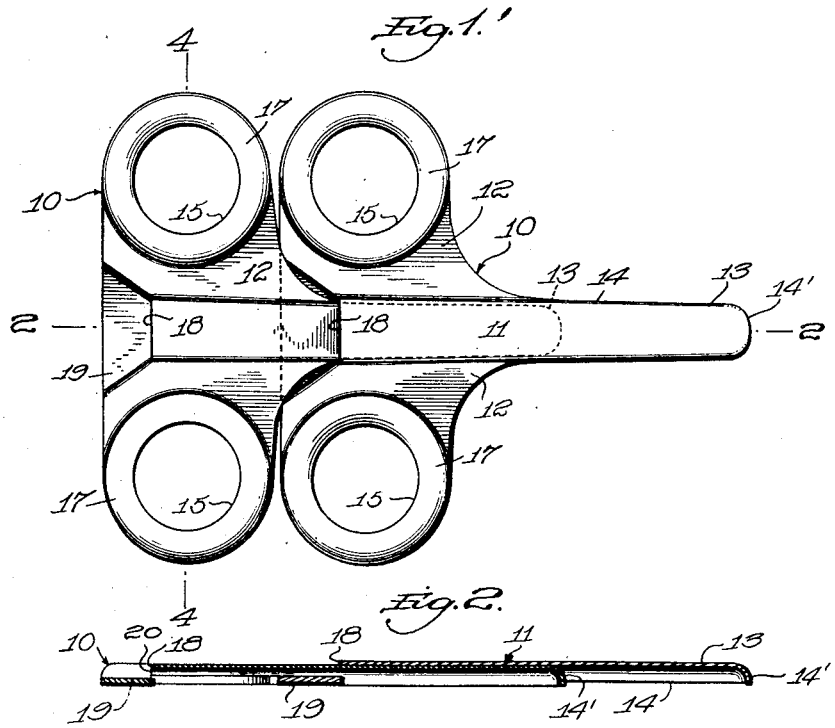
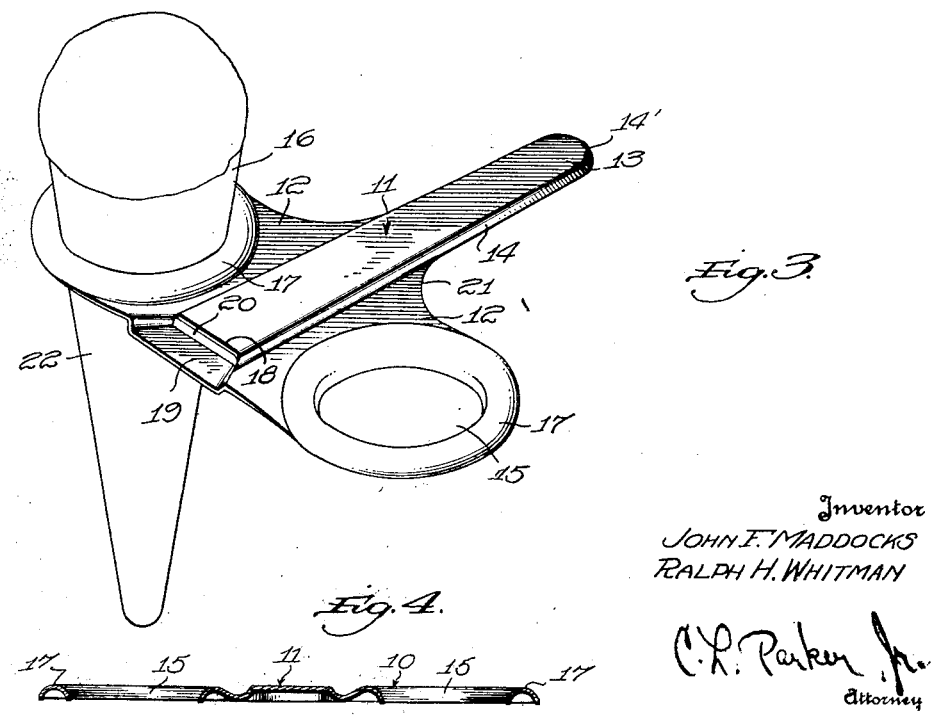
Inventor
JOHN F. MADDOCKS
RALPH H. WHITMAN Patented Oct. 14, 1930

1,778,425

UNITED STATES PATENT OFFICE

JOHN F. MADDOCKS AND RALPH H. WHITMAN, OF NEWPORT, RHODE ISLAND

ARTICLE CARRIER

Application filed August 1, 1929. Serial No. 382,736.

This invention relates to article carriers, and more particularly to a novel form of device adapted for serving ice cream cones or similar articles.

It is the common practice for soda fountains and similar stores to provide what is known as "curb servers" wherein the drivers of motor vehicles may park on the street in front of a store and have sodas, ice cream cones and the like served to them without the necessity of their leaving the vehicles. It is necessary, in the case of ice cream cones, to provide some means for carrying the cones when two or more are ordered, and carriers of this character also are employed in baseball parks and similar places for the same purposes.

An important object of the present invention is to provide a simple and cheaply manufactured device to facilitate the serving of ice cream cones and similar articles.

A further object is to provide a device of the character referred to which is of such character that two or more of the articles may be connected together without the use of fastening means of any kind when it is necessary to serve more than two cones at a time.

A further object is to provide a device of the character referred to which may be readily and cheaply manufactured of cardboard, fiber board or similar material, and which readily may be utilized as an advertising medium for ice cream manufacturers, the proprietors of soda fountains, etc.

A further object is to provide an ice cream cone carrier having a pair of openings therein to receive the lower ends of cones and provided at one side of the carrier with a suitable handle, and to provide the end of the device opposite the handle with a socket adapted to receive the handle of another carrier whereby two or more carriers may be employed at one time for serving more than two cones.

Other objects and advantages of the invention will become apparent during the course of the following description.

In the drawings we have shown one embodiment of the invention. In this showing,

Figure 1 is a plan view showing two of the carriers connected to each other,

Figure 2 is a section on line 2—2 of Figure 1,

Figure 3 is a perspective view of one of the carriers in use, and,

Figure 4 is a section on line 4—4 of Figure 1.

Referring to the drawings the numeral 10 designates each of a pair of carriers adapted to be connected together in a manner to be referred to to permit the serving of four ice cream cones, and as will become apparent, more of the devices are adapted to be connected together when a larger number of cones are to be served. Each carrier comprises a body or shank portion indicated as a whole by the numeral 11, and the shank is provided with opposite laterally extending portions 12, as shown in Figures 1 and 3. One end of the shank projects a substantial distance beyond the lateral portions 12, as indicated at 13, and the portion 13 serves as a handle for carrying the device, and also partly as means for connecting one carrier to another carrier when desired. The body or shank 11 is turned downwardly at its edge portions as at 14 and at its free end as at 14' to strengthen the device longitudinally to prevent it from buckling in use.

Each laterally projecting portion 12 is provided with an opening 15 adapted to receive the lower end of an ice cream cone 16, as indicated in Figure 3. Each opening 15 is preferably circular in shape and is surrounded by a stiffening bead 17, curved in cross section as indicated in Figure 4, to provide the laterally projecting portions of the device with suitable strength to prevent any buckling action.

The shank 11 has the end thereof opposite the handle 13 terminating inwardly of the extremities of the laterally projecting portions 12, as indicated at 18, and the outer portion of the device is depressed to form a connecting strip 19 defining, in connection with the end 18 of the shank 11, an opening 20 for the reception of the handle of another carrier. The shanks 11 are preferably slightly tapered to decrease in width toward the handle portions thereof, and accordingly the handle of one carrier is adapted to be inserted in the opening 20 of another carrier and to fit snugly within the side flanges 14 of the latter.

For the purpose of additionally strengthening the device, the laterally projecting portions 12 may be connected to the shank 11 by curved portions 21, as indicated in Figure 3, and the opposite sides of the connecting strip 19 preferably terminate in outwardly diverging shoulders 22 to accommodate the curved shape 21 of the laterally projecting portions 12.

The operation of the device is as follows:
When only one or two ice cream cones are to be served, a single carrier may be employed as will be obvious. If three or four cones are ordered by customers, the handle 13 of one of the carriers may be inserted through the opening 20 of another carrier, and thus will be received within the shank of the latter carrier. Thus two carriers will be connected together to permit three or four cones to be served at one time. It will be apparent that the carriers will be rigidly supported with respect to each other without the use of any connecting means and they readily may be detached when desired. It also will be apparent that any number of the carriers may be similarly connected together according to the number of cones to be served.

For the sake of economy in manufacture, the devices are preferably made of cardboard, fiber board or similar material, and since the carriers are exact duplicates of each other, all of them may be readily and quickly manufactured from a single set of dies. The cross sectional shapes of the shank 11 and the beads 17 of each of the carriers serves to greatly stiffen the device to permit the use of cheap material of the character referred to.

As previously stated, the device may be used as an advertising medium, and its use for this purpose is rendered more desirable by the fact that it is readily subject to cheap quantity production. Accordingly the advertisements of ice cream manufacturers, the proprietors of soda fountains, etc., may be printed or stamped upon the upper faces of the shanks 11.

It is to be understood that the form of the invention herewith shown and described is to be taken as a preferred example of the same and that various changes in the shape, size and arrangement of parts may be resorted to without departing from the spirit of the invention or the scope of the subjoined claims.

We claim:

1. A device of the character described comprising a body having a longitudinally projecting handle at one end thereof and article receiving openings at the other end spaced on opposite sides of the longitudinal center of said body, the last named end of said body being provided with an opening adapted to receive the handle of a similar body inserted therein whereby the last named body will be supported by the first named body.

2. A device of the character described comprising a body having a longitudinally projecting handle at one end thereof and article receiving openings at the other end spaced on opposite sides of the longitudinal center of said body, the last named end of said body being provided with a transverse strip vertically offset with respect to the adjacent end of said handle to form an opening between said strip and said handle to receive the handle of a similar body inserted therein whereby the last named body will be supported by the first named body.

3. A device of the character described comprising a body formed of sheet material having a handle projecting from one end thereof and provided with an article receiving opening, the opposite edge portions of said handle being turned downwardly to form reinforcing ribs, the other end of said body being provided with an opening adapted to receive the handle of a similar body inserted therethrough, the handle of the second named body being adapted to fit within and beneath the handle of the first named body.

4. A device of the character described comprising a body formed of sheet material having a longitudinally projecting handle at one end thereof and article receiving openings adjacent the other end spaced on opposite sides of the longitudinal center of said body, the opposite edge portions of said handle being turned downwardly to form reinforcing ribs, the second named end of said body being provided with an opening adapted to receive the handle of a similar body inserted therethrough, the handle of the second named body being adapted to fit within and beneath the handle of the first named body.

5. A device of the character described comprising a body having a handle projecting from one end thereof, the other end of said body being provided with an opening adapted to receive the handle of a similar body inserted therein whereby said first named body is adapted to support said second named body, said first named body being provided with an annular bead stamped from the plane thereof and defining an article receiving opening.

6. A device of the character described comprising a body having a longitudinally projecting handle at one end thereof and article receiving openings at the other end spaced on opposite sides of the longitudinal center of said body, said body being provided with stamped up beads defining said openings, the last named end of said body being provided with an opening adapted to receive the handle of a similar body inserted therethrough, the handle of said second named body being adapted to fit within and beneath the handle of the first named body.

7. A device of the character described comprising a body having a longitudinally projecting handle at one end thereof tapered slightly to decrease in width toward its outer end, said body being provided adjacent its opposite end with article receiving openings spaced on opposite sides of the longitudinal center of said body, and being provided with an opening adapted to receive the handle of a similar body inserted therethrough, the handle of each body being provided at its edge portions with downturned reinforcing ribs whereby the handle of the second named body is adapted to fit within and beneath the handle of the first named body.

8. A device of the character described comprising a body having a longitudinally projecting handle at one end thereof tapered slightly to decrease in width toward its outer end and provided at its edges with downturned reinforcing ribs slightly converging toward the free end of said handle, said body being further provided adjacent its opposite end with annular reinforcing beads spaced on opposite sides of the longitudinal center of said body to define article receiving openings, the last named end of said body being provided with a transverse strip offset below the adjacent end of said handle to form therewith an opening to receive the handle of a similar body inserted therethrough, the handle of said second named body being adapted to fit within and beneath the handle of the first named body.

In testimony whereof we affix our signatures.

JOHN F. MADDOCKS.
RALPH H. WHITMAN.